INVENTOR.
Morio Sato
BY Ernest Montague
attorney

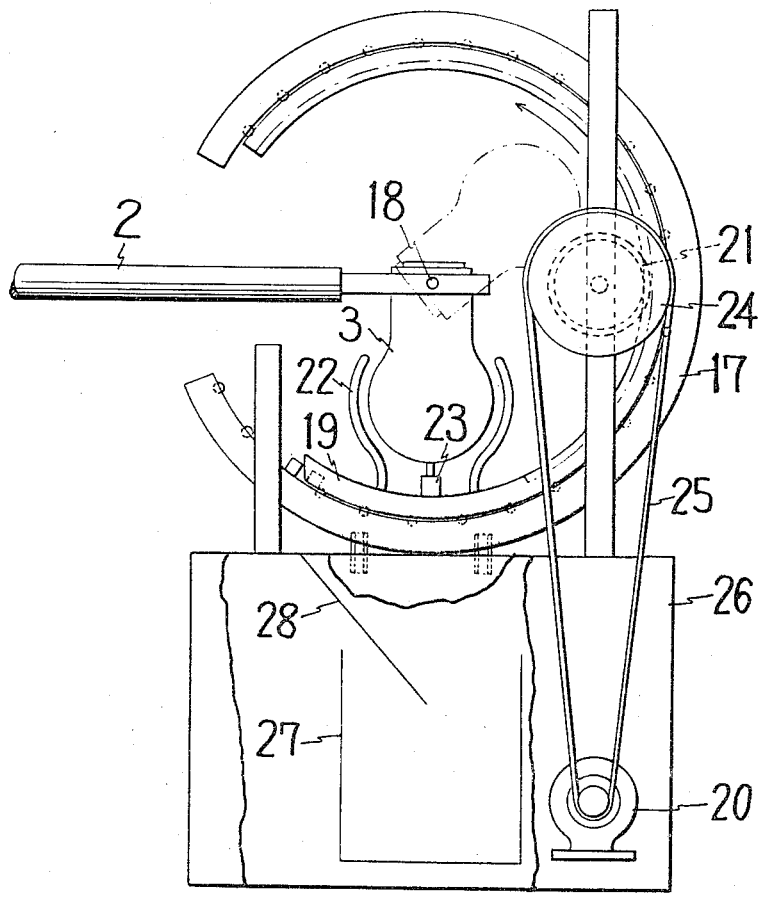

United States Patent Office 3,370,323
Patented Feb. 27, 1968

3,370,323
APPARATUS FOR MOLDED PLASTIC PRODUCTS
Morio Sato, Tokyo, Japan, assignor to Kyowa Kako Kabushiki Kaisha, Katsushika-ku, Tokyo, Japan
Original application July 14, 1965, Ser. No. 471,848. Divided and this application Dec. 14, 1965, Ser. No. 513,688
1 Claim. (Cl. 18—26)

ABSTRACT OF THE DISCLOSURE

An apparatus for producing molded plastic articles comprising a rotatable disc frame having a plurality of equally spaced molds rotatably and tiltably mounted on the periphery of the disc frame. A series of operating stations including a material pouring unit, an agitating means, and a high-frequency heating furnace are provided at relative positions about the periphery corresponding to the mold positions. A means for laterally turning the molds is provided, having a ring frame mounted adjacent the periphery of the rotatable disc frame and having its center at the pivot of the molds for lateral turning, and having mounted rotatably and coaxially therein a rotatable inner ring frame having an inside vacant portion for passage of the molds therethrough. A pair of clip arms inwardly extend from the inner ring frame to receive therebetween the molds passing by the lateral turning station and a limit switch, between the clip arms, and a motor combination is provided and geared to the inner circumference of the inner ring for turning the inner ring frame, when a mold enters the clip arms, about the lateral pivot of the mold.

---

This is a divisional application of the copending application Ser. No. 471,848, filed July 14, 1965.

This invention relates to an apparatus for a so-called paste resin process for producing molded articles of a synthetic resin, in which a synthetic resin such as vinyl chloride or similar substance thereof is uniformly dispersed into a mixture of a plasticizer and a diluent and the mixture thus compounded is heated in molds to obtain molded plastic products having such an appearance as is suggestive of the human skin and muscles, and relates to the apparatus for producing the same.

The principal object of the invention is to obtain such molded plastic products with a simplified equipment installable in a reduced space and with continuous operations for dispensing with troublesome labor to cover the respective molds with lids or to remove the lids from the molds, and further to reduce the time required for solidifying the paste-like materials of plastics in any desired thickness within the molds by using high-frequency heating of the molds.

Namely, the present invention relates to an apparatus for producing molded plastic articles characterized in that the paste-like materials of plastics to be molded are poured into a series of molds and these molds are successively received in an induction type high-frequency heating furnace and means to laterally turning the molds most regions of the paste-like materials within the molds in a desired thickness on the respective inside surfaces of the molds, and thereafter the paste-like materials leftover in the middle of the respective molds are discharged from the molds.

Further, the present invention relates to an apparatus for producing in such molds plastic articles characterized in that a plurality of molds are rotatably mounted on the periphery of a rotatable frame spaced at the same distance and adapted to shift in consecutive order together with intermittent movements of the rotating frame, and a series of operation units or means; material pouring unit, material agitating means, high-frequency heating furnace and menas for laterally turning the molds are arranged at their relative positions corresponding to those of the respective molds.

With these and other objects in view which will become apparent in the following detailed description, the present invention will be clearly understood in connection with the accompanying drawings, in which:

FIG. 3 is a schematic side view of a further modified apparatus showing means for laterally turning the molds.

Figure 1:
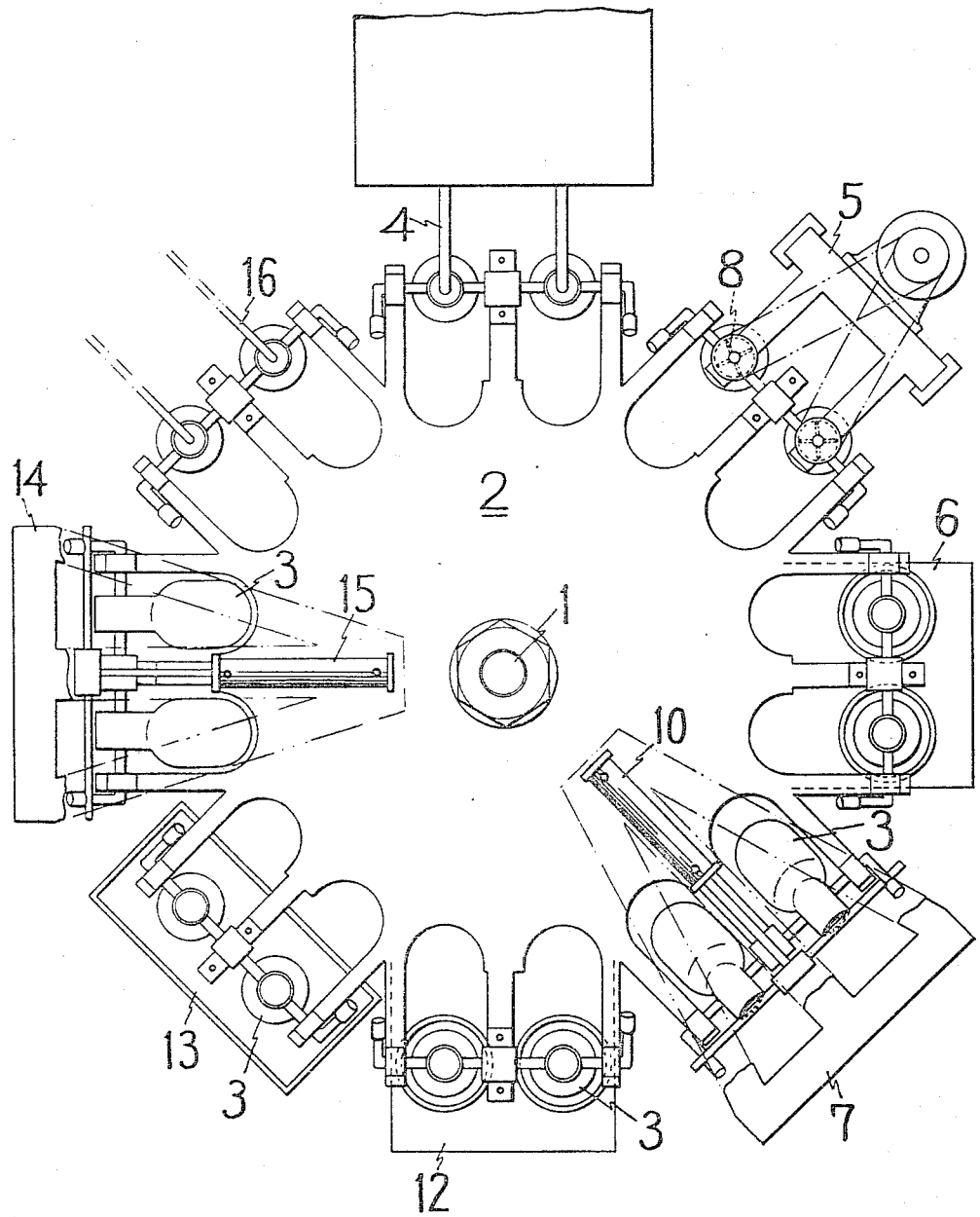
FIGURE 1 is a schematic plan view of an assembly of an apparatus according to the present invention.
Figure 2:
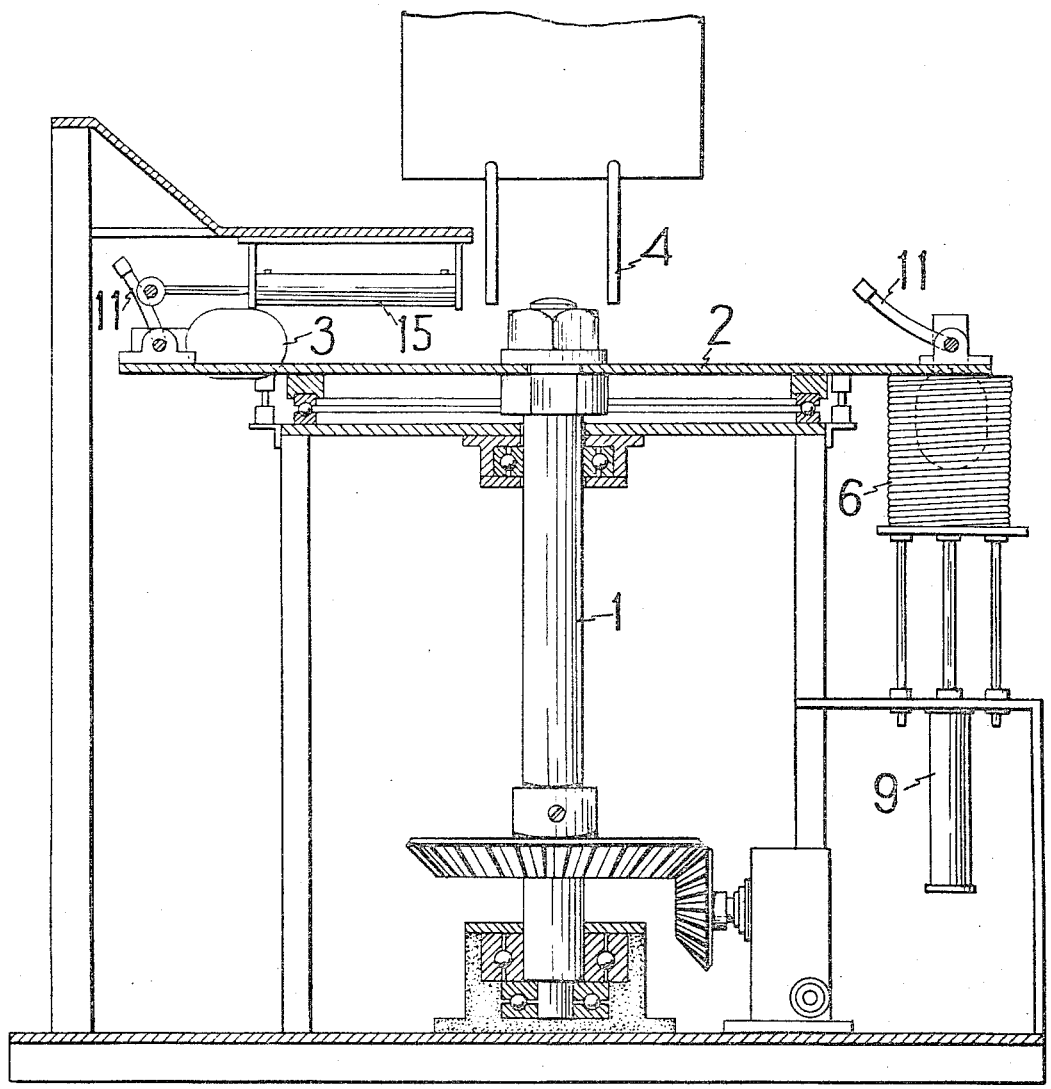
FIG. 2 is a longitudinally sectioned side view of the apparatus shown in FIG. 1.

Referring now to the drawings, the first embodiment of the invention will be explained with reference to the drawings. A rotatable disk frame 2 is fixedly connected with a shaft 1, and on the periphery of the disk frame 2 are rotatably mounted a plurality of molds 3 equally spaced, the angle made by any neighboring two sets of the molds being adapted to be the same as the advancing angle of an intermittent movement of the rotating frame 2. At the relative positions above and below the disk frame, corresponding to the respective molds, there are provided a series of operation units or means which include material pouring unit 4, material agitating means 5, high-frequency heating furnace 6 and lateral turning means 7 for the molds 3. The material agitating means 5 is provided with agitating blades 8 which are adapted to descend and plunge into the molds 3 as the latter are brought to their positions under the agitating means. The high-frequency heating furnace 6 is provided with an oil pressure cylinder 9 for elevating the heating furnace to receive therein the molds 3 as the latter are brought to their position above the heating means. The lateral turning means 7 for the molds 3 includes an oil pressure cylinder 10 for pressing a bar 11 which is rigidly connected with each set of the molds in a unified body, and this bar 11 is actuated by the oil pressure cylinder 10 when the molds are brought to their positions under the lateral turning means.

As the disk frame 2 intermittently rotates in consecutive order, the molds are filled with paste like plastic material by the material pouring unit 4. The plastic material is then agitated by the agitating blades 8 of the material agitating means 5 to spread the materials into every portion within the molds, and thereafter the molds are heated to solidify only the outer regions of the plastic material adjacent to the inside walls of the molds 3 by the high-frequency heating furnace 6 as the latter is elevated to receive the molds. Finally the molds are laterally turned to discharge the inner regions of unsolidified materials, thereby to obtain molded plastic articles from the thus solidified plastic material remaining within the molds.

Referring now again to the drawings, secondary high-frequency heating furance 12 and a cooling water tank 13, both are provided with respective oil pressing means for elevating them into their operating positions for heating or cooling the molds 3. A means 14 is provided for laterally turning the molds 3 to take out the molded products from the molds, which is driven by an oil pressure mechanism 15. A means 16 is provided for cleaning the molds 3 by blowing compressed air into the molds after the molded products are evacuated from the molds.

In conventional apparatus of this kind, it has been a practice to carry the molds on a series body or rotatable frame and to enclose a suitable amount of paste like material in the molds which are covered tightly with lids, and to turn the molds in all directions to uniformly cause the materials to cling to the inside walls of the molds owing to the centrifugal force or the like, and during this time to pass the molds through a heating furnace and a cooling water tank to produce the molded products within the molds. Therefore, since the molds should be turned around in all directions and should be heated while turned, the equipment inevitably is large and the heating efficiency thereof is reduced. Moreover, since the molds should be covered tightly with lids, excessive labor is required for covering the molds with the lids and for removing the lids from the molds, and consequently the cost of the produced products becomes rather expensive.

The present invention eliminates all these defects in such a way that, firstly, the paste like materials are poured to fill up the molds and then a high-frequency current is passed through the molds. Only the molds themselves are heated without heating the interior of the molds to solidify only the outer regions of the materials adjacent the inside walls of the molds. In this case, as the other regions of the material remain in their paste like state, by discharging such unsolidified regions of the material from the molds, the desired plastic articles having a uniform thickness can be produced within the molds.

Therefore, with the present invention, the equipment is much simplified and the installation space for the equipment can be greatly reduced, and in addition, excessive labor as required for covering the respective molds with lids and for removing the lids from the molds can be eliminated, and further by using high-frequency heating of the molds, the time required for the solidification of the paste like material can be substantially curtailed. In fact, the time required for heating the molds up to a temperature of 300° C. is reduced to 1 minute in the apparatus according to the present invention, while as much as 10 minutes is in conventional apparatus to obtain the same result. And, owing to this advantages of the present invention, the cost of manufacturing such molded products can be greatly lowered.

Although there are two types of high-frequency heating, i.e. induction heating and dielectric heating, the present invention preferably adopts an induction heating system, wherein only the molds are heated by the induction heating and the paste like materials enclosed in the molds are heated through the medium of the heat of the molds, and as the molds are rapidly heated by the induction heating, molded plastic products of a uniform thickness are produced upon the inside walls of the molds, and the rest of the paste like material is discharged so that it can be used again.

Further, in the induction heating system adopted in the present invention, the high-frequency current passes through the induction coil receiving the molds to be heated. In this case, since only the molds themselves are directly heated by the induction heating without heating the outside of the coil, the heating efficiency can be remarkably increased, and in addition, since the heat does not substantially emanate on the outside, the ambient temperature will not rise very much and there is an advantage that this facilitates the manufacturing operation of such molded products in the summer seasons and prevents the operator from being fatigued.

Referring now again to the drawings, and more particularly to FIG. 3, a second embodiment of the present invention is illustrated comprising a plurality of molds 3 rotatably and tiltably mounted on the periphery of a rotatable disk frame 2 spaced at the same distance, the angle of any neighboring two sets of the molds being adapted to be the same as the advancing angle of an intermittent movement of the rotating frame 2. A series of operation units or means such as a material pouring unit, a material agitating means, and a high-frequency heating furnace (not shown in FIG. 3) are provided at the relative positions corresponding to that of the molds mounted on the periphery of the disk frame 2. There is also provided a ring frame 17 having its center at a pivot 18 for rotating the molds 3 and having at one side a vacant portion which defines a passage for the molds 3 as the disk frame 2 rotates, and the ring frame 17 fits with a rotatable inner ring frame 19 which has also a vacant portion at one side thereof. The inner circumference of the inner ring frame 19 is constituted like an internal gear which is engageable with a gear 21 driven by a motor 20. A pair of clip arms 22 for holding the molds 3 are extruded into the passage of the molds, and thereunder a limit switch 23 is provided.

In this case, as the disk frame 2 intermittenly rotates and the bottom ends of the molds come in contact with the limit switch 23, the motor 20 starts to turn and the inner ring frame 19 is driven by the motor, while the clip arms 22 hold and rotate the molds 3 around the pivot 18. As shown in FIG. 3, a pulley 24, a belt 25, a base frame 26, a tank 27 and a guide plate 28 are provided, the tank and guide plate for receiving the paste like material. The other portions of the apparatus are substantially the same as those shown in the first embodiment of the present invention and therefore further detailed explanation thereof is not necessary.

This embodiment presents an improved means for laterally turning the molds in the apparatus for producing molded articles as disclosed in the first embodiment of the invention, wherein as the disk frame 2 intermittently rotates in consecutive order, the molds 3 are filled with the paste like plastic material by the material pouring unit 4. The plastic material is then agitated by the agitating means 5 (FIG. 1) to spread the material into every region within the molds, and thereafter the molds are heated to solidify only the outer regions of the plastic material adjacent to the inside walls of the molds 3 by the high-frequency heating furnace 6 (FIG. 1) as the latter is elevated to receive the molds. Finally the molds are laterally turned to discharge the inner regions of unsolidified materials. In the embodiment as shown in FIG. 1, when using an oil pressure cylinder to rectilinearly press the molds 3 together with the connecting bar thereof, there is a defect in that the tilting angle of the molds will not sufficiently evacuate all the paste like materials from the molds in the optimum condition. In the improved means, when the bottom ends of the molds 3 come in contact with the limit switch 23, the motor 20 (FIG. 3) turn and the inner ring frame 19 is driven to turn together with the clip arms 22 to hold and tilt the molds 3 around the pivot 18, giving a sufficient tilting angle of the molds to effect a perfect evacuation of the paste like materials remaining within the molds. After the evacuation, the inner ring frame 19 is reversely turned to return to its position as shown in full lines in FIG. 3 for the next mold.

As mentioned above, according to this embodiment, there is an advantage that the constitution is simple and the operation is positive and the unused materials within the molds can be thoroughly evacuated.

While I have disclosed one embodiment of the present invention, it is to be understood that this embodiment is given by example only and not in a limiting sense, the scope of the present invention being determined by the objects and the claim.

I claim:
1. In an apparatus for producing molded plastic articles comprising a rotatable disk frame, a plurality of molds rotatably and tiltably mounted on the periphery of said disk frame adapted to intermittently rotate with an advancing angle the same as the angle made by neighboring of said molds, a series arrangement of a material pouring unit means, a material agitating means, and a high-frequency heating furnace provided at relative positions corresponding to said molds; a means for laterally turning said molds in said apparatus for the production of molded plastic articles comprising a ring frame rigidly mounted adjacent said periphery of said rotatable disc frame and having its center at a pivot for rotating said molds on said periphery of said disc frame and having at its inner side a vacant portion for passage of said molds, a rotatable inner ring frame having a vacant portion at its inner side thereof, said rotatable inner ring frame coaxially and rotatably disposed within said ring frame, a motor and a motor gear driven by said motor, the inner circumference of said inner ring frame is formed to constitue an internal gear and is engaged by said motor gear for being rotated relative to said rigid ring frame by said motor, a pair of clip arms extruded into said passage of said molds inwardly from said inner ring frame, a limit switch provided within said clip arms and connected to said motor for actuation thereof, and said clip arms are adapted to receive, hold and rotate said molds around said pivot when said disk frame intermittently rotates said molds into said lateral turning means and into said clip arms and into contact with said limit switch, thereby actuating said motor and rotatably driving said inner ring frame about said pivot.

References Cited

UNITED STATES PATENTS

| | | | |
|---|---|---|---|
| 2,681,472 | 6/1954 | Remfel | 18—26 |
| 2,862,237 | 12/1958 | Rekettye | 18—26 |
| 3,041,671 | 7/1962 | Ericson | 18—26 |
| 3,068,518 | 12/1962 | Miller et al. | 18—26 |
| 3,072,965 | 1/1963 | Miller | 18—26 |
| 3,151,196 | 9/1964 | Tipton | 18—26 XR |
| 3,165,565 | 1/1965 | Cox et al. | 18—26 XR |

WILLIAM J. STEPHENSON, *Primary Examiner.*